United States Patent
Kanai

(10) Patent No.: US 8,896,932 B2
(45) Date of Patent: Nov. 25, 2014

(54) ZOOM LENS AND IMAGING APPARATUS

(75) Inventor: Makoto Kanai, Tokyo (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 13/478,824

(22) Filed: May 23, 2012

(65) Prior Publication Data

US 2013/0003191 A1   Jan. 3, 2013

(30) Foreign Application Priority Data

Jun. 28, 2011   (JP) ................. 2011-142615

(51) Int. Cl.
  *G02B 15/14*   (2006.01)
  *G02B 15/173*   (2006.01)
(52) U.S. Cl.
  CPC .................... *G02B 15/173* (2013.01)
  USPC ........................................ 359/690
(58) Field of Classification Search
  CPC .................................. G02B 15/173
  USPC ................................. 359/686, 690
  See application file for complete search history.

(56) References Cited

U.S. PATENT DOCUMENTS

| 2003/0223122 | A1* | 12/2003 | Ozaki | 359/676 |
| 2010/0202053 | A1* | 8/2010 | Toyoda | 359/557 |
| 2011/0254994 | A1* | 10/2011 | Saito et al. | 348/340 |

FOREIGN PATENT DOCUMENTS

| JP | 2004-029765 | 1/2004 |
| JP | 2008-122775 | 5/2008 |

* cited by examiner

*Primary Examiner* — William Choi
(74) *Attorney, Agent, or Firm* — Rader, Fishman & Grauer PLLC

(57) ABSTRACT

A zoom lens comprises, in order from the object side: a first lens group that has a positive refractive power; a second lens group that has a negative refractive power; and a third lens group that has a positive refractive power. Zooming is performed by changing spaces between the first to third lens groups during zooming from a wide-angle end to a telephoto end. The third lens group includes, in order from the object side, a positive lens group, having a positive refractive power, and a negative lens group, disposed to be close to the image side thereof and having a negative refractive power, with an air gap, which is widest in the third lens group, interposed therebetween. The third lens group satisfies the condition $-0.45 < fGF/fGR < -0.10$, where fGF is a focal length of the positive lens group, and fGR is a focal length of the negative lens group.

20 Claims, 17 Drawing Sheets

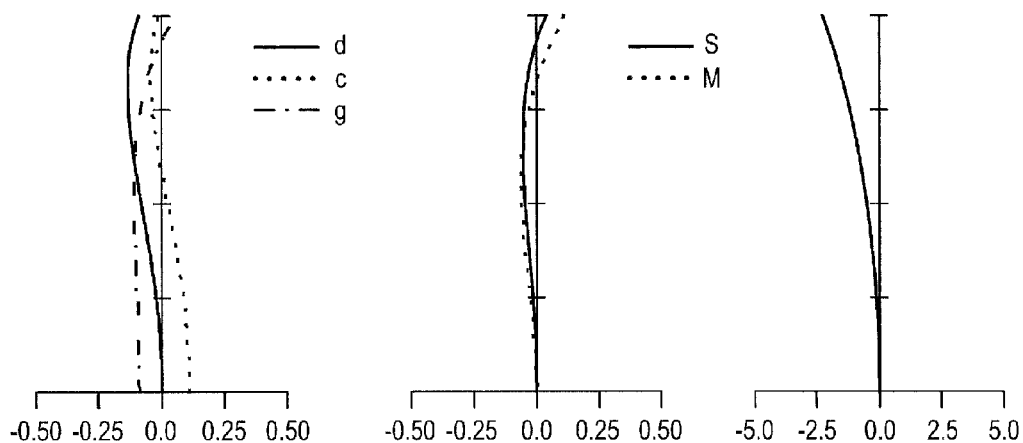

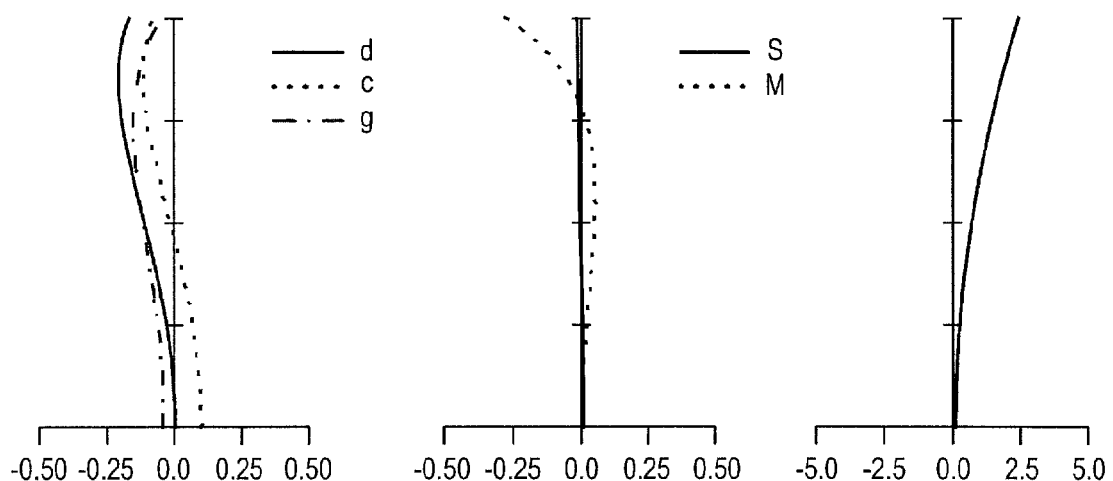

FIG.4A
FIG.4B
FIG.4C
SPHERICAL
ABERRATION
ASTIGMATISM
DISTORTION
Fno=6.25
ω=2.8
ω=2.8
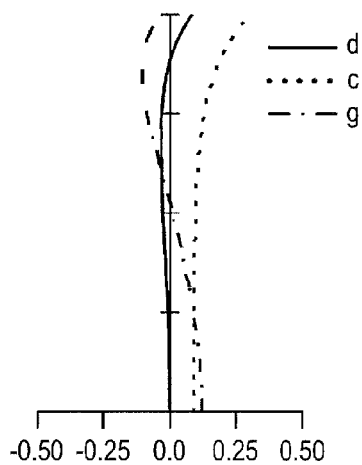
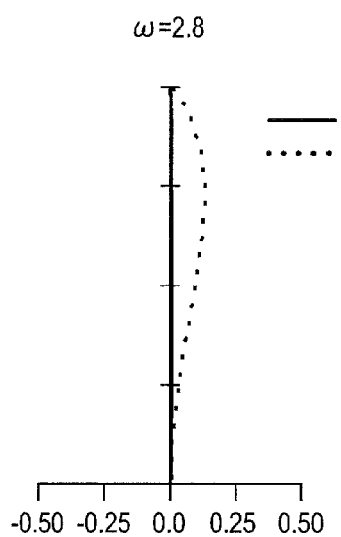
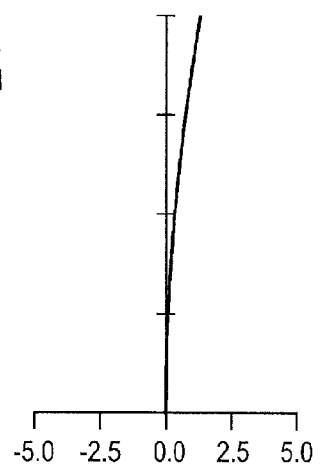

SPHERICAL
ABERRATION

Fno=4.00

ASTIGMATISM

ω=14.5

DISTORTION

ω=14.5

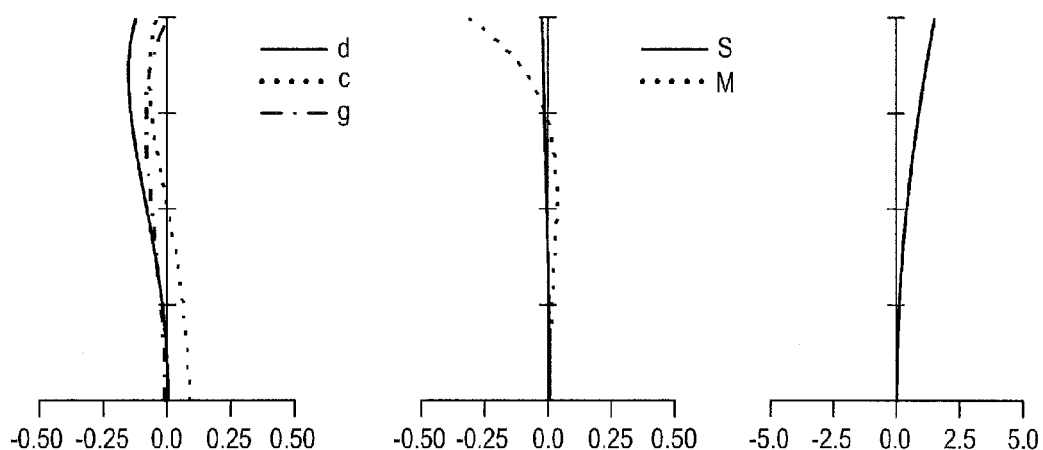

SPHERICAL
ABERRATION

Fno=6.43

—— d
······ c
—·—g

-0.50 -0.25 0.0 0.25 0.50

ASTIGMATISM

ω=2.8

—— S
····· M

-0.50 -0.25 0.0 0.25 0.50

DISTORTION

ω=2.8

-5.0 -2.5 0.0 2.5 5.0

SPHERICAL
ABERRATION

Fno=4.11

— d
····· c
—·— g

ASTIGMATISM

ω=14.4

— S
····· M

DISTORTION

ω=14.4

FIG.11A
SPHERICAL ABERRATION
Fno=4.82
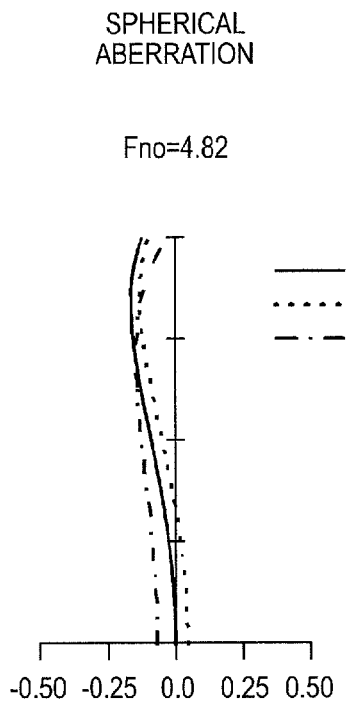
-0.50 -0.25 0.0 0.25 0.50
FIG.11B
ASTIGMATISM
ω=5.2
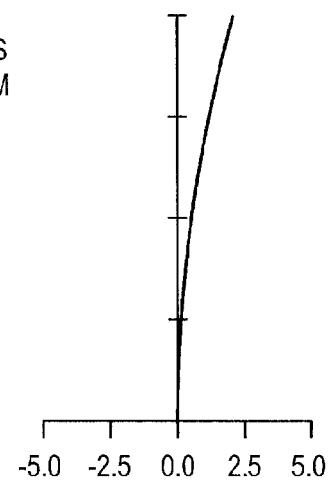
-0.50 -0.25 0.0 0.25 0.50
FIG.11C
DISTORTION
ω=5.2
-5.0 -2.5 0.0 2.5 5.0

SPHERICAL
ABERRATION

Fno=6.31

—— d
······ c
—·— g

-0.50 -0.25 0.0 0.25 0.50

ASTIGMATISM

ω=2.8

—— S
····· M

-0.50 -0.25 0.0 0.25 0.50

DISTORTION

ω=2.8

-5.0 -2.5 0.0 2.5 5.0

SPHERICAL
ABERRATION

Fno=4.16

ASTIGMATISM

ω=14.5

DISTORTION

ω=14.5

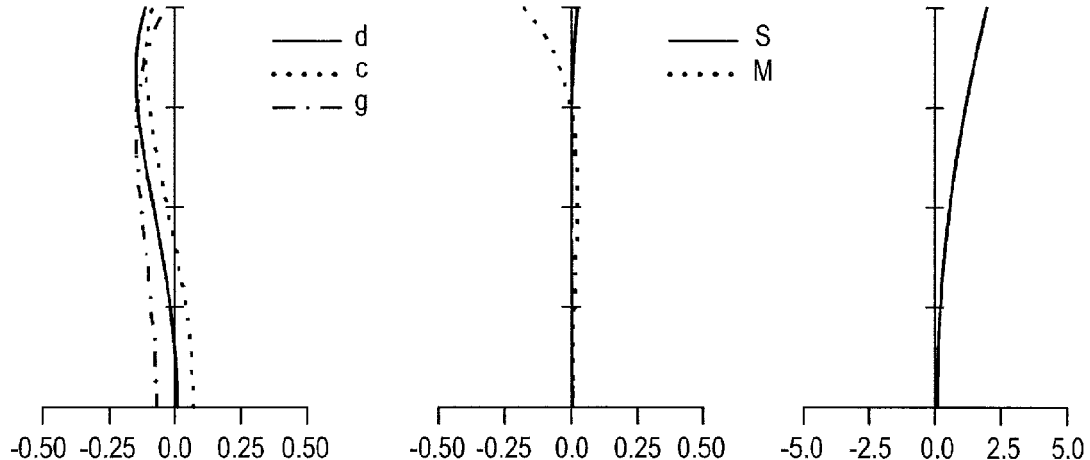

FIG.16A
SPHERICAL
ABERRATION
Fno=6.15
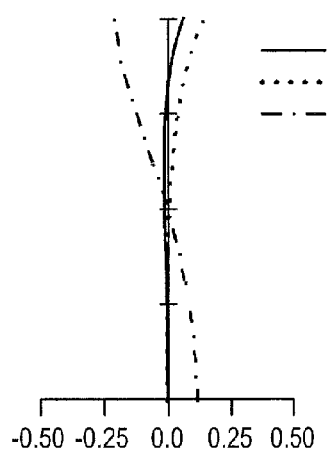
—— d
······ c
—·— g
-0.50 -0.25 0.0 0.25 0.50
FIG.16B
ASTIGMATISM
ω=2.8
—— S
····· M
-0.50 -0.25 0.0 0.25 0.50
FIG.16C
DISTORTION
ω=2.8
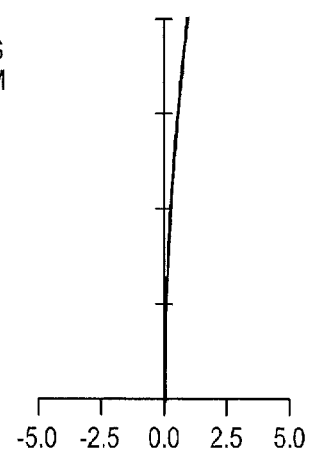
-5.0 -2.5 0.0 2.5 5.0

ZOOM LENS AND IMAGING APPARATUS

FIELD

The present technology relates to a zoom lens and an imaging apparatus. Specifically, the present technology relates to a zoom lens, which is suitable as an optical imaging system used for lens-interchanging apparatuses of so-called interchangeable-lens digital cameras, and an imaging apparatus using the same.

BACKGROUND

Recently, imaging apparatuses, such as interchangeable-lens digital cameras, using solid-state imaging devices have come into widespread use. It is necessary for such interchangeable-lens digital cameras to have excellent imaging performance, compactness, low cost, and a high zoom ratio. In particular, it is necessary for entry-level telephoto zoom lenses to have a focal length range in which the zoom ratio is greater than five magnifications and a half angle of view is less than 3° at a telephoto-end focal length of about 450 mm nominal in 35 mm film equivalent.

As the zoom lenses for the interchangeable-lens digital cameras, there are various known lenses. In particular, as lenses suitable for the telephoto zoom lenses, there are known lenses each of which is constituted of four lens groups or three lens groups. For example, there have been proposed lenses each of which includes, in order from the object side, a first lens group that has a positive refractive power, a second lens group that has a negative refractive power, and a third lens group that has a positive refractive power (refer to, for example, JP-A-2004-029765 and JP-A-2008-122775).

SUMMARY

Generally, in positive lead-type optical systems, particularly, in most cost-priority entry-level lenses for interchangeable-lens cameras among them, a first lens group, which normally has the largest diameter and a large weight in the optical system, is used in focusing. The main reasons are that, since the shifted length of the first lens group for focusing caused by a change in the object distance is constant regardless of the zoom position, mechanical configuration is easy, and the configuration is highly advantageous in terms of cost. In contrast, using a second lens group in focusing can be considered. However, instead of having the advantage that the overall length of the lens does not change during focusing, difficulty in mechanical configuration increases, and thus this focusing method is more disadvantageous than the focusing of the first lens group in terms of cost performance.

In any case of the first group focusing and the second group focusing, the focusing lens group is located to be closer to the object side in the lens system. Thus, when the focusing lens group is projected or housed, it is necessary to avoid interference with lens constituent members closer to the image side. For this reason, it is difficult to arrange a member like a focus driving mechanism just around the focusing lens group. Accordingly, it is necessary to arrange the focus driving mechanism in the periphery behind the third lens group which has a relatively small diameter and is located at a position closer to the image side than the position at which the interference with different members is avoidable. From this point of view, in the above-mentioned existing zoom lenses, the diameter of the third lens group in which an actuator for focus driving is disposed is relatively large, and thus the lenses are disadvantageous to a reduction in the overall size thereof.

Therefore, it is desirable to reduce the size of the overall lens by decreasing the diameter of the third lens group.

An embodiment of the present technology is directed to a zoom lens and an imaging apparatus including the zoom lens. The zoom lens includes, in order from the object side: a first lens group that has a positive refractive power; a second lens group that has a negative refractive power; and a third lens group that has a positive refractive power. In the zoom lens, zooming is performed by changing spaces between the first to third lens groups during zooming from a wide-angle end to a telephoto end. The third lens group includes, in order from the object side, a positive lens group, which has a positive refractive power, and a negative lens group, which is disposed to be close to the image side thereof and has a negative refractive power, with an air gap, which is widest in the third lens group, interposed therebetween. The zoom lens satisfies the following Conditional Expression (1).

$$-0.45 < fGF/fGR < -0.10 \quad (1)$$

Here, fGF is the focal length of the positive lens group, and fGR is the focal length of the negative lens group. Thereby, the ratio of the focal lengths of the positive lens group GF and the negative lens group GR constituting the third lens group is defined.

Further, in the embodiment of the present technology, the following Conditional Expression (2) may be further satisfied.

$$0.1 < L3/ft < 0.2 \quad (2)$$

Here, L3 is the length of the third lens group on the optical axis, and ft is the focal length of the whole system at the telephoto end of the zoom lens. Thereby, the overall length of the third lens group is defined.

Further, in the embodiment of the present technology, the negative lens group constituting the third lens group may include a cemented lens which is disposed to be closest to the object side, has a negative refractive power, and is formed of a positive lens convex toward the object side and a negative lens concave toward the image side. The following conditional expressions (3) and (4) may be satisfied.

$$0.2 < (RLR1-RLR2)/(RLR1+RLR2) < 0.8 \quad (3)$$

$$ndLR2 > 1.72 \quad (4)$$

Here, RLR1 is the radius of curvature of a surface of the cemented lens closest to the object side, RLR2 is the radius of curvature of a surface of the cemented lens closest to the image side, and ndLR2 is the refractive index of the negative lens at the d-line. Thereby, a ratio of the radius of curvature of the surface of the cemented lens BL closest to the object side and the surface thereof closest to the image side is defined, and the refractive index of negative lens LR2 constituting the cemented lens BL is defined.

Further, in the embodiment of the present technology, the following Conditional Expression (5) may be further satisfied.

$$vdp/vdn > 1.18 \quad (5)$$

Here, vdp is the Abbe number of the positive lens constituting the cemented lens at the d-line, and vdn is the Abbe number of the negative lens constituting the cemented lens at the d-line. Thereby, the relationship of the Abbe numbers of the positive lens LR1 and the negative lens LR2 constituting the cemented lens BL is defined.

Further, in the embodiment of the present technology, the negative lens group constituting the third lens group may include, in order from the object side, a cemented lens which has a negative refractive power and is formed of a positive lens convex toward the object side and a negative lens concave toward the image side, and a second positive lens. Thereby, spherical aberration during zooming and astigmatism and distortion at the wide-angle end are satisfactorily corrected.

According to the embodiment of the present technology, by decreasing the diameter of the third lens group in the zoom lens, it is possible to obtain an excellent effect of reducing the size of the overall lens.

BRIEF DESCRIPTION OF THE DRAWINGS

FIGS. 2A to 2C are diagrams illustrating aberrations at the wide-angle end of the zoom lens according to the first embodiment of the present technology;

FIGS. 3A to 3C are diagrams illustrating aberrations at the middle focal length between the wide-angle end and the telephoto end of the zoom lens according to the first embodiment of the present technology;

FIGS. 4A to 4C are diagrams illustrating aberrations at the telephoto end of the zoom lens according to the first embodiment of the present technology;

FIGS. 7A to 7C are diagrams illustrating aberrations at the middle focal length between the wide-angle end and the telephoto end of the zoom lens according to the second embodiment of the present technology;

FIGS. 11A to 11C are diagrams illustrating aberrations at the middle focal length between the wide-angle end and the telephoto end of the zoom lens according to the third embodiment of the present technology;

FIGS. 15A to 15C are diagrams illustrating aberrations at the middle focal length between the wide-angle end and the telephoto end of the zoom lens according to the fourth embodiment of the present technology;

FIGS. 16A to 16C are diagrams illustrating aberrations at the telephoto end of the zoom lens according to the fourth embodiment of the present technology;

DETAILED DESCRIPTION

Figure 1:
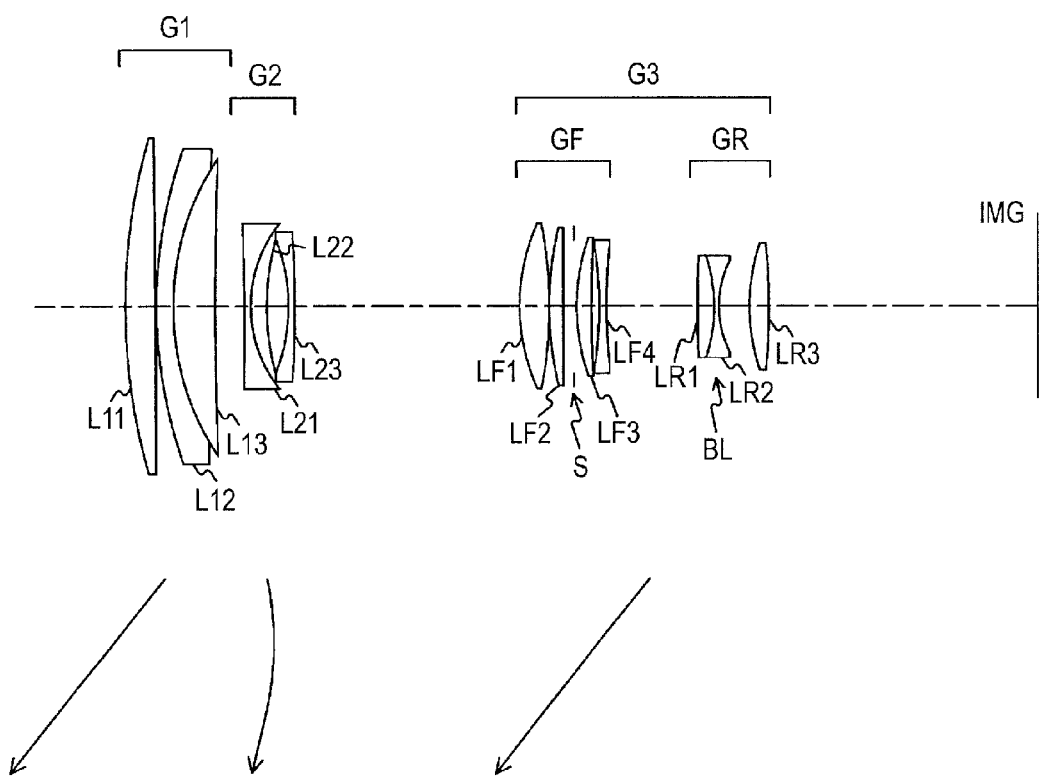
FIG. 1 is a diagram illustrating a lens configuration of a zoom lens according to a first embodiment of the present technology.

A zoom lens according to the present technology includes, in order from the object side, a first lens group G1 that has a positive refractive power, a second lens group G2 that has a negative refractive power, and a third lens group G3 that has a positive refractive power. During zooming from a wide-angle end to a telephoto end, the zooming is performed by changing spaces between the first to third lens groups G1 to G3. The third lens group G3 includes, in order from the object side, a positive lens group GF, which has a positive refractive power, and a negative lens group GR, which is disposed to be close to the image side thereof and has a negative refractive power, with an air gap, which is widest in the third lens group G3, interposed therebetween. In the zoom lens according to the present technology, by appropriately constituting the third lens group G3, the size of the overall lens system decreases.

Further, it is preferable that the zoom lens according to the present technology satisfies the following Conditional Expression (1).

$$-0.45 < fGF/fGR < -0.10 \quad (1)$$

Here, fGF is the focal length of the positive lens group GF, and fGR is the focal length of the negative lens group GR.

The Conditional Expression (1) defines the ratio of the focal lengths of the positive lens group GF constituting the third lens group G3 and the negative lens group GR disposed to be close to the image side. If the result value of the Conditional Expression (1) is less than the lower limit thereof, the refractive power of the negative lens group GR relatively becomes too strong. Hence, it not only becomes difficult to correct various aberrations such as spherical aberration and coma aberration, but also the relative sensitivity in eccentricity within the third lens group G3 increases, difficulty in manufacture increases, and thus this situation is not preferable. Further, if the result value of the Conditional Expression (1) is greater than the upper limit thereof, the refractive power of the negative lens group GR becomes relatively weak, and an effect of diverging rays converged by the positive lens group GF becomes too weak. Hence, the diameters of the lenses constituting the negative lens group GR, of which the lens diameter is smallest in the zoom lens system, increase.

Further, it is preferable that the zoom lens according to the present technology satisfies the following Conditional Expression (2).

$$0.1 < L3/ft < 0.2 \quad (2)$$

Here, L3 is the length of the third lens group G3 on the optical axis, and ft is the focal length of the whole system at the telephoto end of the zoom lens. The Conditional Expression (2) defines the overall length of the third lens group G3. If the result value of the Conditional Expression (2) is less than the lower limit thereof, the overall length of the third lens group G3 is shortened, and this case is advantageous to a reduction in size of the lens system. However, in this case, it is necessary for the respective refractive powers of the positive lens group GF and the negative lens group GR constituting the third lens group G3 to become strong. Thus, it is difficult to correct spherical aberration and the like, and the relative sensitivity in eccentricity within the third lens group G3 increases. If the result value of the Conditional Expression (2) is greater than the upper limit thereof, the overall length of the third lens group G3 increases, and the overall length of the lens system increases. Hence, it is difficult to reduce the size thereof.

In addition, it is preferable that the zoom lens according to the present technology satisfies the following conditional expressions (1') and (2') in the ranges of the conditional expressions (1) and (2).

$$-0.35 < fGF/fGR < -0.20 \quad (1')$$

$$0.13 < L3/ft < 0.17 \quad (2')$$

Further, in the zoom lens according to the present technology, it is preferable that the negative lens group GR constituting the third lens group G3 includes a cemented lens BL which is disposed to be closest to the object side, has a negative refractive power, and is formed of a positive lens LR1 convex toward the object side and a negative lens LR2 concave toward the image side. Thereby, in order for the negative lens group GR to diverge the rays converged by the positive lens group GF constituting the third lens group G3, the surface of the negative lens group GR closest to the object side is made to be convex, whereby it is possible to suppress the angle of rays incident onto the surface, and it is possible to minimize occurrence of spherical aberration. Further, the surface of the cemented lens BL closest to the image side is made to be concave, whereby the off-axis rays are highly deflected. Thus, it is possible to minimize the lens diameter of the cemented lens BL.

Further, it is preferable that the zoom lens according to the present technology satisfy the following conditional expressions (3) and (4).

$$0.2 < (RLR1-RLR2)/(RLR1+RLR2) < 0.8 \quad (3)$$

$$ndLR2 > 1.72 \quad (4)$$

Here, RLR1 is the radius of curvature of a surface of the cemented lens BL closest to the object side, RLR2 is the radius of curvature of the surface of the cemented lens BL closest to the image side, and ndLR2 is the refractive index of the negative lens LR2 at the d-line.

The Conditional Expression (3) defines the ratio of the radius of curvature of the surface of the cemented lens BL closest to the image side and the surface thereof closest to the image side. If the result value of the Conditional Expression (3) is less than the lower limit thereof, it is difficult to sufficiently increase the negative refractive power of the cemented lens BL. Hence, the diameter of the negative lens group GR increases, and thus this increase is disadvantageous to a reduction in size of the overall lens system. Further, if the result value of the Conditional Expression (3) is greater than the upper limit thereof, an effect of diverging rays by the surface of the cemented lens BL closest to the image side becomes too strong. Thus, the sensitivity in eccentricity within the third lens group G3 increases. This increase is disadvantageous to manufacturing, and it is difficult to secure a back focal length.

On the other hand, the Conditional Expression (4) defines the refractive index of negative lens LR2 constituting the cemented lens BL. If the result value of the Conditional Expression (4) is less than the lower limit thereof, in order to obtain a necessary negative refractive power, the curvature of the image-side surface of the negative lens LR2 excessively decreases. Hence, occurrence of spherical aberration, coma aberration, and astigmatism excessively increases. As a result, it is difficult to correct the aberrations in the overall lens system.

Note that, it is preferable that the zoom lens according to the present technology satisfies the following conditional expressions (3') and (4') in the ranges of the conditional expressions (3) and (4).

$$0.3 < (RLR1-RLR2)/(RLR1+RLR2) < 0.7 \quad (3')$$

$$ndLR2 > 1.80 \quad (4')$$

Further, it is preferable that the zoom lens according to the present technology further satisfy the following Conditional Expression (5).

$$\nu dp/\nu dn > 1.18 \quad (5)$$

Here, νdp is the Abbe number of the positive lens LR1 constituting the cemented lens BL at the d-line, and νdn is the Abbe number of the negative lens LR2 constituting the cemented lens BL at the d-line.

The Conditional Expression (5) defines the relationship of the Abbe numbers of the positive lens LR1 and the negative lens LR2 constituting the cemented lens BL. If the result value of the Conditional Expression (5) is less than the lower limit thereof, it is difficult to satisfactorily correct chromatic aberration occurring in the whole third lens group G3. Accordingly, by satisfying the Conditional Expression (5), it is possible to further satisfactorily correct chromatic aberration particularly at the telephoto end.

In addition, it is preferable that the zoom lens according to the present technology satisfies the following Conditional Expression (5') in the range of the Conditional Expression (5).

$$\nu dn/\nu dp > 1.23 \quad (5')$$

Further, in the zoom lens according to the present technology, it is preferable that the negative lens group GR constituting the third lens group G3 includes, in order from the object side, the cemented lens BL which has a negative refractive power and is formed of the positive lens LR1 convex toward the object side and the negative lens LR2 concave toward the image side, and a second positive lens LR3. The negative lens group GR constituting the third lens group G3 has a function of correcting off-axis astigmatism and distortion occurring in the first lens group G1 and the second lens group G2. Hence, in the configuration of the negative lens group GR, the second positive lens LR3 is disposed to be close to the image side of the cemented lens BL having a negative refractive power. Thereby, it is possible to satisfactorily correct astigmatism and distortion at the wide-angle end and spherical aberration during zooming, and it easy to secure the back focal length.

In addition, in the zoom lens according to the present technology, one lens group or a part of one lens group among the first lens group G1 to the final lens group G3 is shifted in a direction which is substantially perpendicular to the optical axis, whereby it is possible to shift an image. As described above, the zoom lens according to the present technology includes combination of a detection system that detects image blur by shifting the lens group or apart thereof in a direction substantially perpendicular to the optical axis, a driving system that shifts the respective lens groups, and a control system that applies a shift length to the driving system on the basis of the output of the detection system. Thereby, the zoom lens according to the present technology is able to function as a vibration-proof optical system. In particular, by using the cemented lens BL constituting the negative lens group GR of the third lens group G3 for the above application, it is possible to reduce deterioration in performance caused by changes in chromatic aberration which particularly causes a problem at the time of image shift, and it is possible to minimize the effect of an increase in size of the lens caused by the setup of the driving mechanism.

Hereinafter, embodiments of the present technology (hereinafter referred to as embodiments) will be described. The description will be given in the following order.

1. First Embodiment (Numerical Example 1)
2. Second Embodiment (Numerical Example 2)
3. Third Embodiment (Numerical Example 3)
4. Fourth Embodiment (Numerical Example 4)
5. Application Example (Imaging Apparatus)

Note that, in the accompanying drawings and tables, the reference signs and the like are defined as follows. That is, "surface number" represents an i-th surface counted from the object side to the image side, "Ri" represents a paraxial radius of curvature of the i-th surface, and "Di" represents an on-axis surface space between the i-th surface and an (i+1)th surface counted from the object side (the center thickness of the lens or the air gap). "Ndi" represents the refractive index of a lens or the like including the i-th surface at the d-line (a wavelength of 587.6 nm), "vdi" represents the Abbe number of the lens or the like including the i-th surface at the d-line (the wavelength of 587.6 nm), "f" represents a focal length of the entire lens system, "Fno" represents an open F number, and "ω" represents a half angle of view.

1. First Embodiment

[Lens Configuration]

FIG. 1 is a diagram illustrating a lens configuration of a zoom lens according to a first embodiment of the present technology. The zoom lens according to the first embodiment of the present technology includes, in order from the object side to an image plane IMG: a first lens group G1 that has a positive refractive power; a second lens group G2 that has a negative refractive power; and a third lens group G3 that has a positive refractive power. During zooming from the wide-angle end to the telephoto end, zooming is performed by changing the spaces between the first to third lens groups.

The first lens group G1 includes: a biconvex lens L11; and a cemented lens which is formed of a convex lens L12 and a biconvex lens L13. That is, the first lens group G1 is formed of three lenses L11, L12, and L13, and has a positive refractive power as a whole.

The second lens group G2 includes: a biconcave lens L21; and a cemented lens which is formed of a convex lens L22 and a concave lens L23. That is, the second lens group G2 is formed of three lenses L21, L22, and L23, and has a negative refractive power as a whole.

The third lens group G3 includes, in order from the object side, the positive lens group GF, which has a positive refractive power, and the negative lens group GR, which is disposed to be close to the image side thereof and has a negative refractive power, with an air gap, which is widest in the third lens group G3, interposed therebetween. In addition, the third lens group G3 has a positive refractive power as a whole. In addition, during zooming from a wide-angle end to a telephoto end, zooming is performed by changing the space between the positive lens group GF and the negative lens group GR.

The positive lens group GF includes, in order from the object side: two biconvex lenses LF1 and LF2; an aperture stop S; and a cemented lens which is formed of a biconvex lens LF3 and a biconcave lens LF4. Further, the negative lens group GR includes: a cemented lens BL which is formed of the biconvex lens LR1 and the biconcave lens LR2; and a biconvex lens LR3.

[Zoom Lens Data]

Table 1 shows the lens data of Numerical Example 1 of the zoom lens, to which specific numerical values are applied, according to the first embodiment of the present technology.

TABLE 1

| Surface Number | R | D | Nd | v d |
|---|---|---|---|---|
| 1 | 89.814 | 5.272 | 1.618000 | 63.39 |
| 2 | −2792.763 | 0.250 | | |
| 3 | 78.123 | 2.531 | 1.90366 | 31.32 |
| 4 | 45.117 | 7.019 | 1.48749 | 70.44 |
| 5 | 509.707 | D5 | | |
| 6 | −447.504 | 1.100 | 1.72916 | 54.67 |
| 7 | 21.398 | 2.268 | 1.92286 | 20.88 |
| 8 | 39.389 | 3.614 | | |
| 9 | −37.680 | 1.1 | 1.83481 | 42.72 |
| 10 | −256.905 | D10 | | |
| 11 | 32.249 | 4.985 | 1.48749 | 70.44 |
| 12 | −76.065 | 0.150 | | |
| 13 | 58.146 | 2.500 | 1.618000 | 63.39 |
| 14 | −382.326 | 1.500 | | |
| 15 | Aperture Stop | 0.500 | | |
| 16 | 31.206 | 2.685 | 1.49700 | 81.61 |
| 17 | 328.805 | 1.314 | | |
| 18 | −65.914 | 1.000 | 1.84666 | 23.78 |
| 19 | 105.192 | 15.279 | | |
| 20 | 100.000 | 2.747 | 1.68893 | 31.16 |
| 21 | −27.266 | 0.700 | 1.83481 | 42.72 |
| 22 | 20.000 | 5.206 | | |
| 23 | 31.922 | 3.134 | 1.59551 | 39.22 |
| 24 | −84.916 | | | |

In the first embodiment of the present technology, when the lens position changes from the wide-angle end to the telephoto end, the spaces of the lens groups to be described below change. That is, the spaces are a space D5 between the first lens group G1 and the second lens group G2, and a space D10 between the second lens group G2 and the third lens group G3. Table 2 shows the open F value Fno, the focal length f, the half angle of view w, the respective values of the spaces D5 and D10 at the wide-angle end (f=56.6), the middle focal length (f=150.0), and the telephoto end (f=291.0).

TABLE 2

| Fno | 4.00 | 4.74 | 6.25 |
|---|---|---|---|
| f | 56.6 | 150.0 | 291.0 |
| ω | 14.4 | 5.3 | 2.8 |
| D5 | 5.000 | 39.030 | 46.925 |
| D10 | 37.217 | 17.114 | 1.000 |

[Aberrations of Zoom Lens]

FIGS. 2A to 4C show respective aberration diagrams of the zoom lens according to the first embodiment of the present technology. FIGS. 2A to 2C are diagrams illustrating aberrations at the wide-angle end of the zoom lens according to the first embodiment of the present technology. FIGS. 3A to 3C are diagrams illustrating aberrations at the middle focal length between the wide-angle end and the telephoto end of the zoom lens according to the first embodiment of the present technology. FIGS. 4A to 4C are diagrams illustrating aberrations at the telephoto end of the zoom lens according to the first embodiment of the present technology. FIGS. 2A, 3A, and 4A show spherical aberration diagrams, FIGS. 2B, 3B, and 4B show astigmatism diagrams, and FIGS. 2C, 3C, and 4C show distortion diagrams.

Note that, in each spherical aberration diagram, the solid line represents a value at the d-line (the wavelength of 587.6 nm), the dashed line represents a value at the c-line (the wavelength of 656.3 nm), and the chain line represents a value at the g-line (the wavelength of 435.8 nm). Further, in each astigmatism diagram, the solid line S represents a value on the sagittal image plane, and the dashed line M shows a value on the meridional image plane.

2. Second Embodiment

[Lens Configuration]

Figure 5:
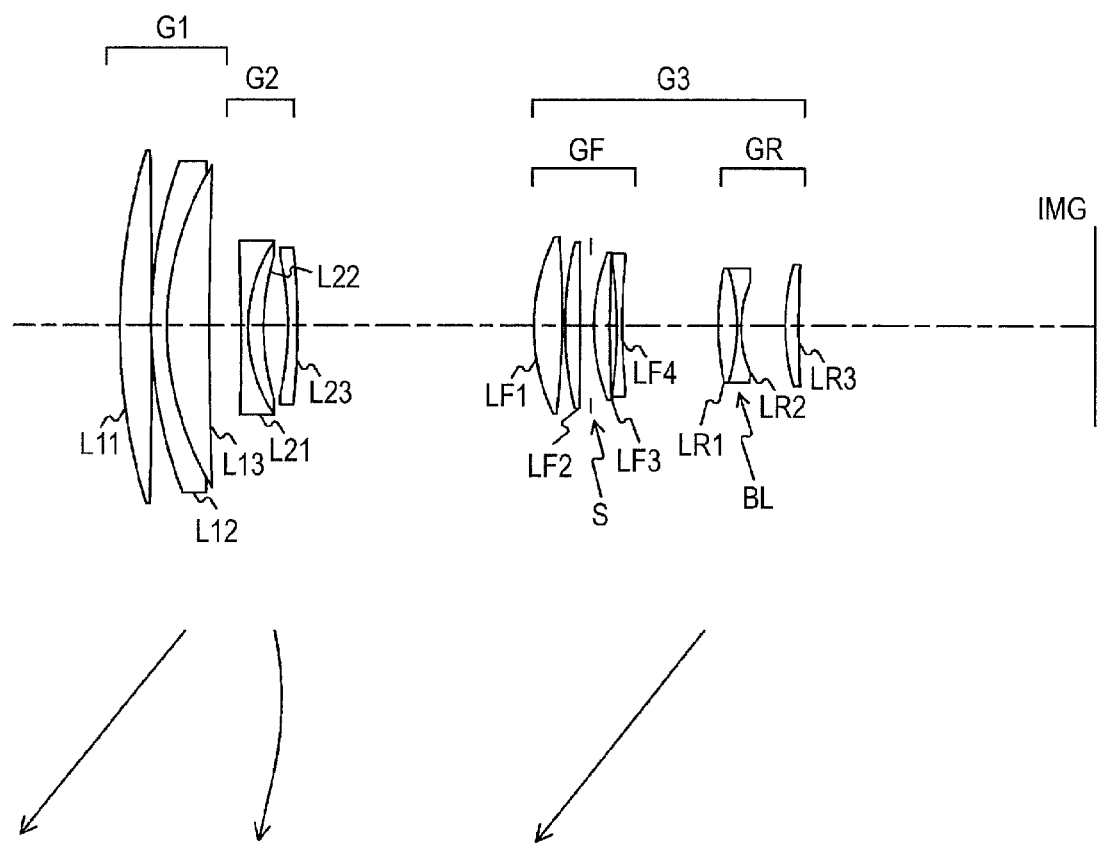
FIG. 5 is a diagram illustrating a lens configuration of a zoom lens according to a second embodiment of the present technology.

FIG. 5 is a diagram illustrating a lens configuration of a zoom lens according to a second embodiment of the present technology. Similar to the first embodiment of the present technology mentioned above, the zoom lens according to the second embodiment of the present technology includes, in order from the object side to an image plane IMG: a first lens group G1 that has a positive refractive power; a second lens group G2 that has a negative refractive power; and a third lens group G3 that has a positive refractive power. That is, the second embodiment of the present technology is different in examples of specific numerical values, but has basically the same configuration as the first embodiment of the present technology mentioned above.

[Zoom Lens Data]

Table 3 shows the lens data of Numerical Example 2 of the zoom lens, to which specific numerical values are applied, according to the second embodiment of the present technology.

TABLE 3

| Surface Number | R | D | Nd | v d |
|---|---|---|---|---|
| 1 | 88.889 | 5.055 | 1.618000 | 63.39 |
| 2 | 15408.713 | 0.150 | | |
| 3 | 78.897 | 2.151 | 1.90366 | 31.32 |
| 4 | 45.823 | 6.921 | 1.48749 | 70.44 |
| 5 | 552.805 | D5 | | |
| 6 | −488.152 | 1.100 | 1.72916 | 54.67 |
| 7 | 22.026 | 2.636 | 1.92286 | 20.88 |
| 8 | 40.444 | 3.913 | | |
| 9 | −41.051 | 1.100 | 1.83481 | 42.72 |
| 10 | −522.434 | D10 | | |
| 11 | 30.200 | 4.886 | 1.48749 | 70.44 |
| 12 | −81.651 | 0.150 | | |
| 13 | 61.882 | 2.500 | 1.618000 | 63.39 |
| 14 | −500.000 | 1.500 | | |
| 15 | Aperture Stop | 0.500 | | |
| 16 | 30.966 | 2.444 | 1.49700 | 81.61 |
| 17 | 170.272 | 1.381 | | |
| 18 | −64.852 | 1.000 | 1.84666 | 23.78 |
| 19 | 110.778 | 15.168 | | |
| 20 | 52.727 | 2.907 | 1.68893 | 31.16 |
| 21 | −22.941 | 0.700 | 1.83481 | 42.72 |
| 22 | 20.000 | 6.900 | | |
| 23 | 34.081 | 2.500 | 1.59551 | 39.22 |
| 24 | −374.351 | | | |

In the second embodiment of the present technology, when the lens position changes from the wide-angle end to the telephoto end, the spaces of the lens groups to be described below change. That is, the spaces are a space D5 between the first lens group G1 and the second lens group G2, and a space D10 between the second lens group G2 and the third lens group G3. Table 4 shows the open F value Fno, the focal length f, the half angle of view ω, the respective values of the spaces D5 and D10 at the wide-angle end (f=56.6), the middle focal length (f=150.0), and the telephoto end (f=291.0).

TABLE 4

| Fno | 4.00 | 4.73 | 6.43 |
|---|---|---|---|
| f | 56.6 | 150.0 | 291.0 |
| ω | 14.5 | 5.3 | 2.8 |
| D5 | 5.000 | 39.732 | 46.573 |
| D10 | 37.769 | 17.050 | 1.000 |

[Aberrations of Zoom Lens]

Figure 6A:
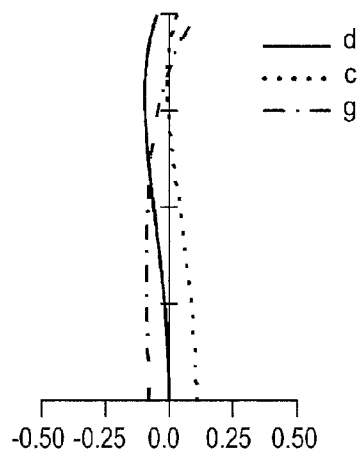
FIGS. 6A to 6C are diagrams illustrating aberrations at the wide-angle end of the zoom lens according to the second embodiment of the present technology.
Figure 6B:
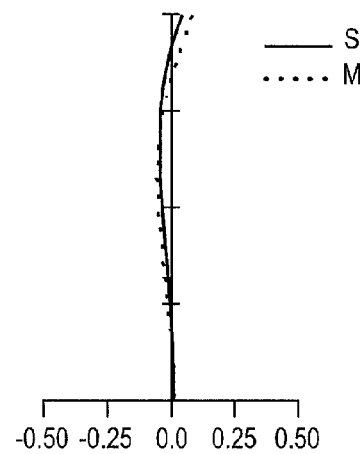
Figure 6C:
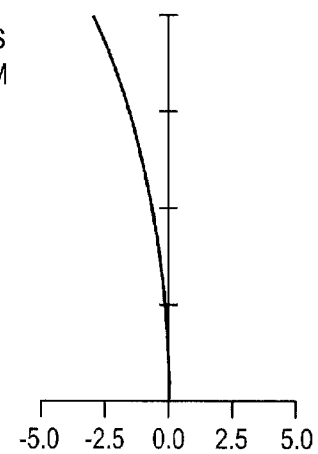
Figures 8A, 8B, 8C:
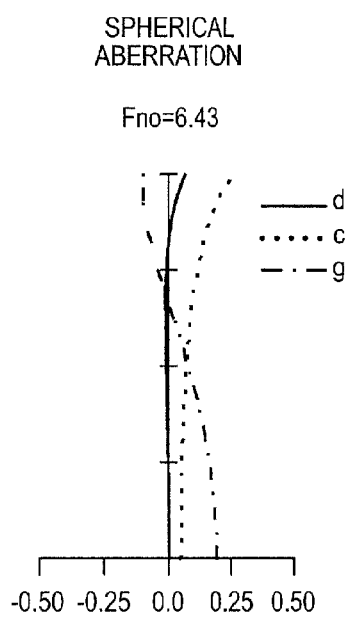
FIGS. 8A to 8C are diagrams illustrating aberrations at the telephoto end of the zoom lens according to the second embodiment of the present technology.

FIGS. 6A to 8C show respective aberration diagrams of the zoom lens according to the second embodiment of the present technology. FIGS. 6A to 6C are diagrams illustrating aberrations at the wide-angle end of the zoom lens according to the second embodiment of the present technology. FIGS. 7A to 7C are diagrams illustrating aberrations at the middle focal length between the wide-angle end and the telephoto end of the zoom lens according to the second embodiment of the present technology. FIGS. 8A to 8C are diagrams illustrating aberrations at the telephoto end of the zoom lens according to the second embodiment of the present technology. FIGS. 6A, 7A, and 8A show spherical aberration diagrams, FIGS. 6B, 7B, and 8B show astigmatism diagrams, and FIGS. 6C, 7C, and 8C show distortion diagrams. Note that, the line types in each aberration diagram is the same as described in the first embodiment of the present technology.

3. Third Embodiment

[Lens Configuration]

Figure 9:
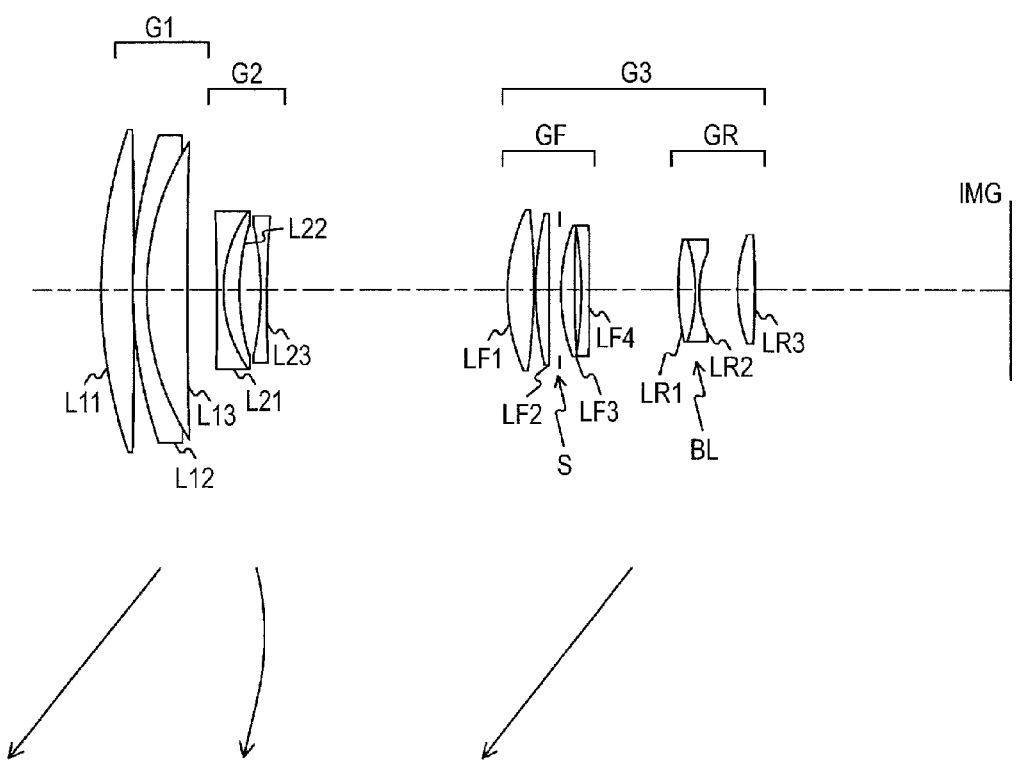
FIG. 9 is a diagram illustrating a lens configuration of a zoom lens according to a third embodiment of the present technology.

FIG. 9 is a diagram illustrating a lens configuration of a zoom lens according to a third embodiment of the present technology. Similar to the first embodiment of the present technology mentioned above, the zoom lens according to the third embodiment of the present technology includes, in order from the object side to an image plane IMG: a first lens group G1 that has a positive refractive power; a second lens group G2 that has a negative refractive power; and a third lens group G3 that has a positive refractive power. That is, the third embodiment of the present technology is different in examples of specific numerical values, but has basically the same configuration as the first embodiment of the present technology mentioned above.

[Zoom Lens Data]

Table 5 shows the lens data of Numerical Example 3 of the zoom lens, to which specific numerical values are applied, according to the third embodiment of the present technology.

TABLE 5

| Surface Number | R | D | Nd | v d |
|---|---|---|---|---|
| 1 | 91.105 | 5.253 | 1.618000 | 63.39 |
| 2 | −2630.060 | 0.150 | | |
| 3 | 79.093 | 2.198 | 1.90366 | 31.32 |
| 4 | 45.902 | 7.000 | 1.48749 | 70.44 |
| 5 | 516.215 | D5 | | |
| 6 | −230.970 | 1.100 | 1.74330 | 49.22 |
| 7 | 22.067 | 3.003 | 1.92286 | 20.88 |
| 8 | 49.229 | 3.374 | | |
| 9 | −48.394 | 1.100 | 1.83400 | 37.34 |
| 10 | 390.797 | D10 | | |
| 11 | 31.812 | 4.575 | 1.49700 | 81.61 |
| 12 | −85.256 | 0.150 | | |
| 13 | 57.578 | 2.500 | 1.618000 | 63.39 |
| 14 | −500.000 | 1.500 | | |
| 15 | Aperture Stop | 0.500 | | |
| 16 | 32.561 | 2.144 | 1.49700 | 81.61 |
| 17 | 114.513 | 1.453 | | |
| 18 | −69.713 | 1.000 | 1.84666 | 23.78 |
| 19 | 176.408 | 15.504 | | |
| 20 | 69.529 | 2.991 | 1.69895 | 30.05 |
| 21 | −20.879 | 0.700 | 1.83400 | 37.34 |

TABLE 5-continued

| Surface Number | R | D | Nd | ν d |
|---|---|---|---|---|
| 22 | 20.000 | 6.486 | | |
| 23 | 33.895 | 2.500 | 1.63980 | 34.57 |
| 24 | −196.930 | | | |

In the third embodiment of the present technology, when the lens position changes from the wide-angle end to the telephoto end, the spaces of the lens groups to be described below change. That is, the spaces are a space D5 between the first lens group G1 and the second lens group G2, and a space D10 between the second lens group G2 and the third lens group G3. Table 6 shows the open F value Fno, the focal length f, the half angle of view ω, the respective values of the spaces D5 and D10 at the wide-angle end (f=56.6), the middle focal length (f=151.8), and the telephoto end (f=291.0).

TABLE 6

| Fno | 4.11 | 4.82 | 6.31 |
|---|---|---|---|
| f | 56.6 | 151.8 | 291.0 |
| ω | 14.4 | 5.2 | 2.8 |
| D5 | 5.000 | 39.779 | 47.242 |
| D10 | 41.086 | 18.664 | 1.000 |

[Aberrations of Zoom Lens]

Figure 10A:
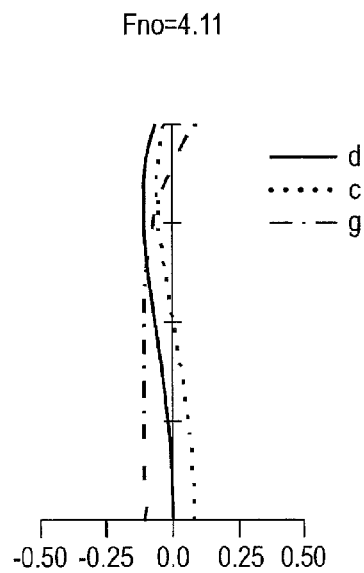
FIGS. 10A to 10C are diagrams illustrating aberrations at the wide-angle end of the zoom lens according to the third embodiment of the present technology.
Figure 10B:
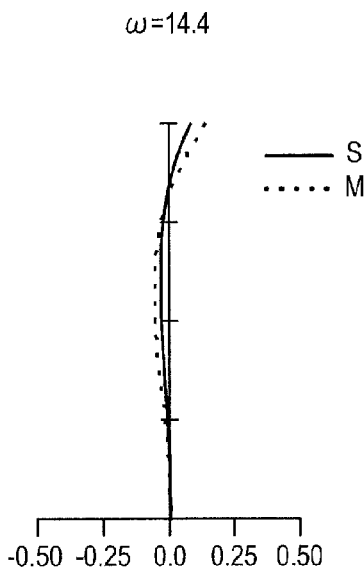
Figure 10C:
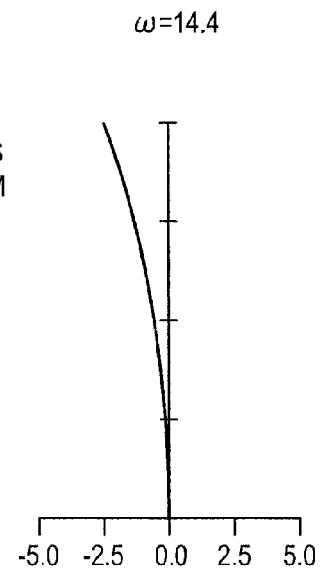
Figure 12A:
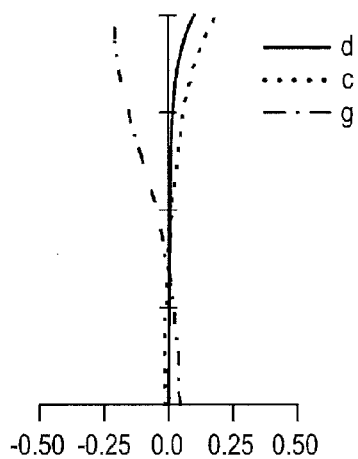
FIGS. 12A to 12C are diagrams illustrating aberrations at the telephoto end of the zoom lens according to the third embodiment of the present technology.
Figure 12B:
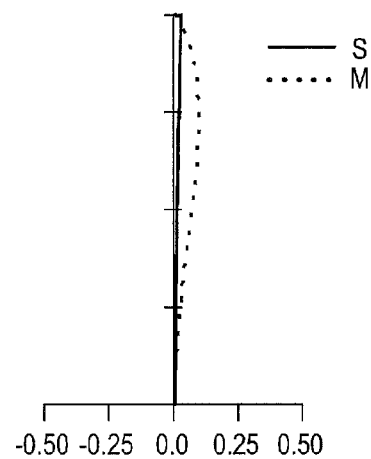
Figure 12C:
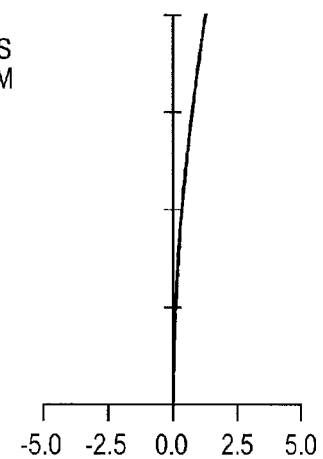

FIGS. 10A to 12C show respective aberration diagrams of the zoom lens according to the third embodiment of the present technology. FIGS. 10A to 10C are diagrams illustrating aberrations at the wide-angle end of the zoom lens according to the third embodiment of the present technology. FIGS. 11A to 11C are diagrams illustrating aberrations at the middle focal length between the wide-angle end and the telephoto end of the zoom lens according to the third embodiment of the present technology. FIGS. 12A to 12C are diagrams illustrating aberrations at the telephoto end of the zoom lens according to the third embodiment of the present technology. FIGS. 10A, 11A, and 12A show spherical aberration diagrams, FIGS. 10B, 11B, and 12B show astigmatism diagrams, and FIGS. 10C, 11C, and 12C show distortion diagrams. Note that, the line types in each aberration diagram is the same as described in the first embodiment of the present technology.

4. Fourth Embodiment

[Lens Configuration]

Figure 13:
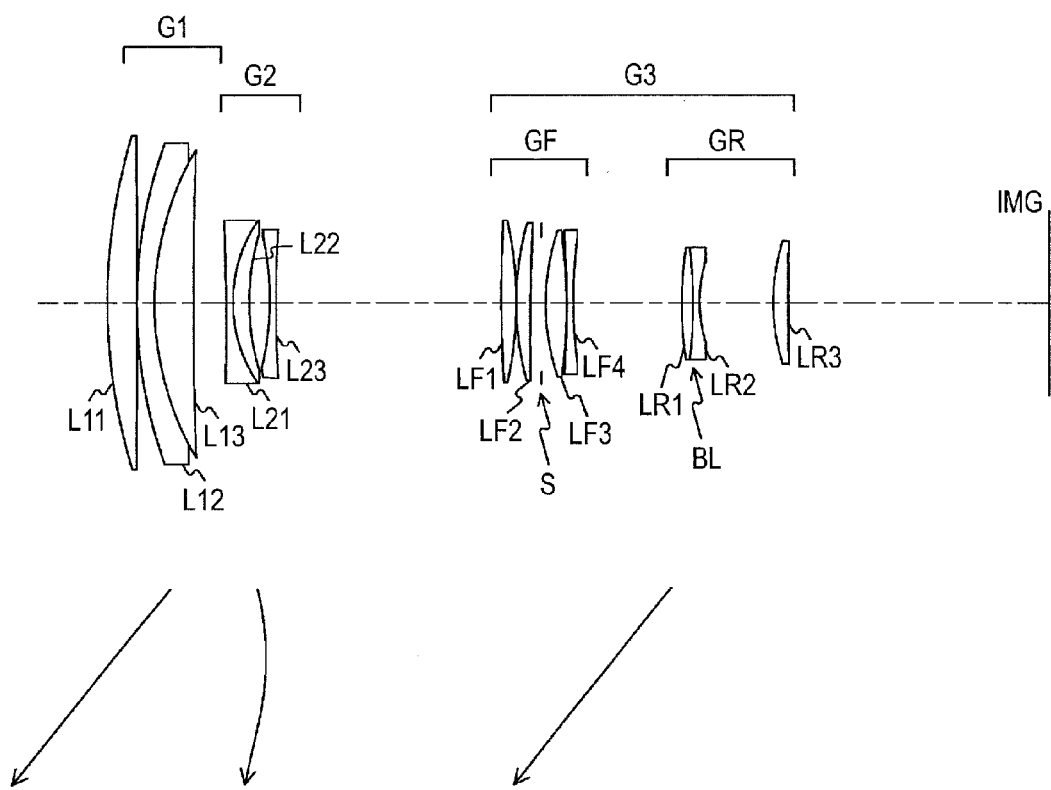
FIG. 13 is a diagram illustrating a lens configuration of a zoom lens according to a fourth embodiment of the present technology.

FIG. 13 is a diagram illustrating a lens configuration of a zoom lens according to a fourth embodiment of the present technology. Similar to the first embodiment of the present technology mentioned above, the zoom lens according to the fourth embodiment of the present technology includes, in order from the object side to an image plane IMG: a first lens group G1 that has a positive refractive power; a second lens group G2 that has a negative refractive power; and a third lens group G3 that has a positive refractive power. That is, the fourth embodiment of the present technology is different in examples of specific numerical values, but has basically the same configuration as the first embodiment of the present technology mentioned above.

[Zoom Lens Data]

Table 7 shows the lens data of Numerical Example 4 of the zoom lens, to which specific numerical values are applied, according to the fourth embodiment of the present technology.

TABLE 7

| Surface Number | R | D | Nd | ν d |
|---|---|---|---|---|
| 1 | 95.119 | 4.840 | 1.618000 | 63.39 |
| 2 | 8514.703 | 0.150 | | |
| 3 | 83.818 | 2.733 | 1.90366 | 31.32 |
| 4 | 48.939 | 6.585 | 1.48749 | 70.44 |
| 5 | 550.832 | D5 | | |
| 6 | −213.809 | 1.100 | 1.74330 | 49.22 |
| 7 | 22.530 | 2.828 | 1.92286 | 20.88 |
| 8 | 46.390 | 3.497 | | |
| 9 | −46.254 | 1.100 | 1.83481 | 42.72 |
| 10 | 2604.067 | D10 | | |
| 11 | 118.873 | 2.467 | 1.48749 | 70.44 |
| 12 | −71.924 | 0.150 | | |
| 13 | 44.422 | 2.635 | 1.618000 | 63.39 |
| 14 | −413.258 | 1.500 | | |
| 15 | Aperture Stop | 0.500 | | |
| 16 | 33.032 | 3.832 | 1.49700 | 81.61 |
| 17 | −111.891 | 0 | | |
| 18 | −110.587 | 1.000 | 1.84666 | 23.78 |
| 19 | 91.406 | 17.593 | | |
| 20 | 42.099 | 2.073 | 1.75211 | 25.05 |
| 21 | −89.195 | 0.845 | 1.83481 | 42.72 |
| 22 | 19.239 | 12.420 | | |
| 23 | 34.897 | 2.237 | 1.49700 | 81.61 |
| 24 | 137.983 | | | |

In the fourth embodiment of the present technology, when the lens position changes from the wide-angle end to the telephoto end, the spaces of the lens groups to be described below change. That is, the spaces are a space D5 between the first lens group G1 and the second lens group G2, and a space D10 between the second lens group G2 and the third lens group G3. Table 8 shows the open F value Fno, the focal length f, the half angle of view w, the respective values of the spaces D5 and D10 at the wide-angle end (f=56.6), the middle focal length (f=150.0), and the telephoto end (f=291.0).

TABLE 8

| Fno | 4.16 | 4.65 | 6.15 |
|---|---|---|---|
| f | 56.6 | 150.0 | 291.0 |
| ω | 14.5 | 5.3 | 2.8 |
| D5 | 5.000 | 46.534 | 54.177 |
| D10 | 36.911 | 17.811 | 1.000 |

[Aberrations of Zoom Lens]

Figure 14A:
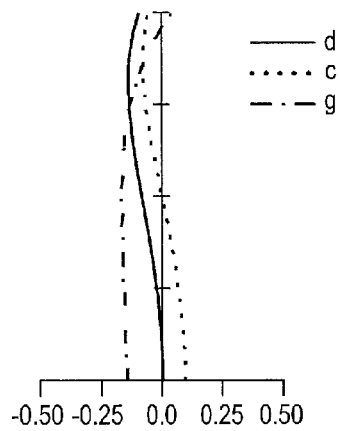
FIGS. 14A to 14C are diagrams illustrating aberrations at the wide-angle end of the zoom lens according to the fourth embodiment of the present technology.
Figure 14B:
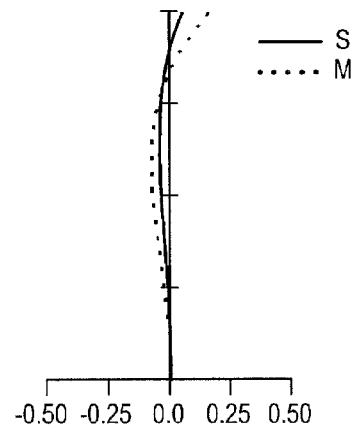
Figure 14C:
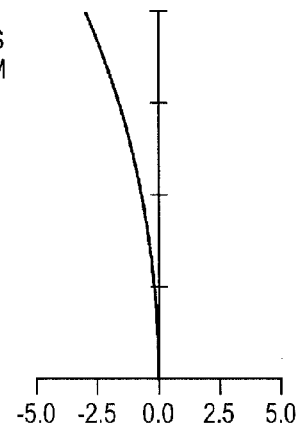

FIGS. 14A to 16C show respective aberration diagrams of the zoom lens according to the fourth embodiment of the present technology. FIGS. 14A to 14C are diagrams illustrating aberrations at the wide-angle end of the zoom lens according to the fourth embodiment of the present technology. FIGS. 15A to 15C are diagrams illustrating aberrations at the middle focal length between the wide-angle end and the telephoto end of the zoom lens according to the fourth embodiment of the present technology. FIGS. 16A to 16C are diagrams illustrating aberrations at the telephoto end of the zoom lens according to the fourth embodiment of the present technology. FIGS. 14A, 15A, and 16A show spherical aberration diagrams, FIGS. 14B, 15B, and 16B show astigmatism diagrams, and FIGS. 14C, 15C, and 16C show distortion diagrams. Note that, the line types in each aberration diagram is the same as described in the first embodiment of the present technology.

[Summary of Conditional Expressions]

Table 9 shows respective values of Numerical Examples 1 to 4 of the first to fourth embodiments of the present technology. As can be clearly seen from the values, the conditional expressions (1) to (5) are satisfied. Further, as can be seen from each aberration diagram, various aberrations are corrected in balance at the wide-angle end, the middle focal length position between the wide-angle end and the telephoto end, and the telephoto end.

TABLE 9

|  | Numerical Example 1 | Numerical Example 2 | Numerical Example 3 | Numerical Example 4 |
|---|---|---|---|---|
| fGF | 32.7 | 34.3 | 33.4 | 33.5 |
| fGR | −114.3 | −164.4 | −99.1 | −121.8 |
| L3 | 41.7 | 42.5 | 42.0 | 47.3 |
| ft | 291.0 | 291.0 | 291.0 | 291.0 |
| RLR1 | 100.000 | 57.727 | 69.530 | 42.099 |
| RLR2 | 20.000 | 20.000 | 20.000 | 19.239 |
| ndLR2 | 1.83481 | 1.83481 | 1.83400 | 1.83481 |
| vdp | 31.16 | 31.16 | 30.05 | 25.05 |
| vdn | 42.72 | 42.72 | 37.34 | 42.72 |
| Conditional Expression (1) | −0.286 | −0.209 | −0.337 | −0.275 |
| Conditional Expression (2) | 0.143 | 0.146 | 0.144 | 0.163 |
| Conditional Expression (3) | 0.667 | 0.450 | 0.553 | 0.373 |
| Conditional Expression (4) | 1.83481 | 1.83481 | 1.83400 | 1.83481 |
| Conditional Expression (5) | 1.371 | 1.371 | 1.243 | 1.705 |

5. Application Example

[Configuration of Imaging Apparatus]

Figure 17:
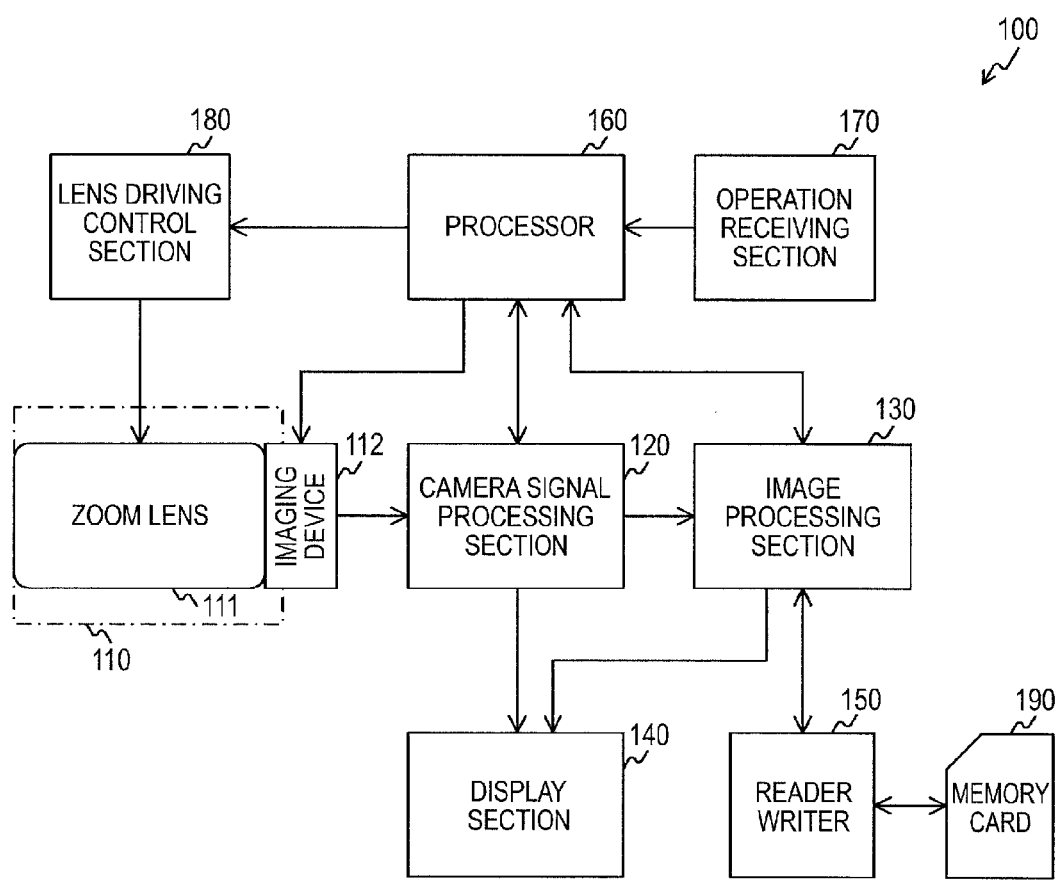
FIG. 17 is a diagram illustrating an example in which the zoom lens according to the first to fourth embodiments of the present technology is applied to an imaging apparatus.

FIG. 17 is a diagram illustrating an example in which the zoom lens according to the first to fourth embodiments of the present technology is applied to an imaging apparatus 100. The imaging apparatus 100 includes: a camera block 110; a camera signal processing section 120; an image processing section 130; a display section 140; a reader writer 150; a processor 160; an operation receiving section 170; and a lens driving control section 180.

The camera block 110 has a function of capturing an image, and includes: a zoom lens 111 according to the first to fourth embodiments of the present technology; and an imaging device 112 that converts an optical image, which is formed by the zoom lens 111, into an electrical signal. As the imaging device 112, a photoelectric conversion device such as a CCD (Charge Coupled Device) or a CMOS (Complementary Metal-Oxide Semiconductor) may be used. In the zoom lens 111, each of the lens groups according to the first to fourth embodiments of the present technology is briefly illustrated herein as a single lens.

The camera signal processing section 120 is configured to perform a signal processing such as an analog-to-digital conversion processing on a captured-image signal. The camera signal processing section 120 converts the output signal, which is output from the imaging device 112, into a digital signal. Further, the camera signal processing section 120 performs various kinds of signal processing such as noise removal, image quality correction, and processing of conversion into luminance and chromatic difference signals.

The image processing section 130 is configured to perform processing of recording and reproducing the image signal. The image processing section 130 performs processing of encoding for compression and decoding for decompression on an image signal based on a predetermined image data format, a process of conversion of data specification such as resolution, and the like.

The display section 140 is configured to display the captured image and the like. The display section 140 has a function for displaying various data such as a condition of the operation performed by a user with the aid of the operation receiving section 170 and a captured image. The display section 140 is formed by, for example, a liquid crystal display (LCD: Liquid Crystal Display).

The reader writer 150 accesses the memory card 190 so as to write and read image signals. The reader writer 150 writes image data, which is encoded by the image processing section 130, into the memory card 190 and additionally reads the image data which is recorded on the memory card 190. The memory card 190 is, for example, a semiconductor memory which is removable from a slot connected to the reader writer 150.

The processor 160 is configured to control the overall imaging apparatus. The processor 160 functions as a control processing section to control all the circuit blocks within the imaging apparatus 100, and controls the circuit blocks on the basis of the operation instruction signals and the like from the operation receiving section 170.

The operation receiving section 170 is configured to receive an operation from a user. The operation receiving section 170 may be realized by, for example, a shutter release button for performing a shutter operation, a selection switch for selecting operation modes, and the like. The operation instruction signal, which is received by the operation receiving section 170, is supplied to the processor 160.

The lens driving control section 180 is configured to control driving of the lenses disposed in the camera block 110. The lens driving control section 180 controls a motor (not shown in the drawing) for driving the respective lenses within the zoom lens 111 on the basis of the control signal from the processor 160.

In the imaging apparatus 100, when the photographing is standby, an image signal captured by the camera block 110 under the control of the processor 160 is output to the display section 140 through the camera signal processing section 120 so as to be displayed as a camera through-the-lens image. Further, when the operation instruction signal for zooming is input from the operation receiving section 170, the processor 160 outputs a control signal to the lens driving control section 180, and moves a prescribed lens within the zoom lens 111 on the basis of the control of the lens driving control section 180.

When the operation receiving section 170 receives a shutter operation, the captured image signal is output from the camera signal processing section 120 to the image processing section 130, is encoded for compression, and is converted into digital data of the predetermined data format. The converted data is output to the reader writer 150 and is written on the memory card 190.

Focusing is performed, for example, when the shutter release button of the operation receiving section 170 is pressed halfway or pressed fully for recording (photography). In this case, on the basis of the control signal received from the processor 160, the lens driving control section 180 moves the prescribed lens of the zoom lens 111.

In a case of reproduction of image data recorded on the memory card 190, the reader writer 150 reads out the prescribed image data from the memory card 190 in response to the operation received by the operation receiving section 170. Then, the readout image data is decoded for decompression by the image processing section 130, and thereafter the reproduced image signal is output to the display section 140, thereby displaying the reproduced image.

Note that, the embodiments of the present technology have been described for the case where the imaging apparatus 100 is applied to a digital still camera. However, the application range of the imaging apparatus 100 is not limited to the digital still camera, and the apparatus may also be widely applied to digital input/output apparatuses such as a digital video camera.

As described above, according to the embodiments of the present technology, the ratio of the positive lens group GF constituting the third lens group and the focal length of the negative lens group GR disposed to be close to the image side is set in a predetermined range. Thereby, the aperture diameter of the third lens group is set to be small, and thus it is possible to reduce the size of the overall zoom lens. That is, it is possible to realize a lens that has excellent imaging performance, compactness, low cost, and a focal length range in which the zoom ratio is greater than five magnifications and a half angle of view is less than 3° at a telephoto-end focal length of about 450 mm nominal in 35 mm film equivalent.

Note that, the above-mentioned embodiment of the present technology shows an example for embodying the present technology, and thus the items in the embodiments of the present technology respectively correspond to the specific items of the appended claims in the present technology. Likewise, the specific items of the appended claims respectively correspond to the items represented by the same names in the embodiments of the present technology. However, the present technology is not limited to the embodiments of the present technology, and may be embodied by applying various modifications to the embodiments without departing from the present technical scope of the present technology.

(1) A zoom lens including, in order from the object side: a first lens group that has a positive refractive power; a second lens group that has a negative refractive power; and a third lens group that has a positive refractive power, wherein zooming is performed by changing spaces between the first to third lens groups during zooming from a wide-angle end to a telephoto end, wherein the third lens group includes, in order from the object side, a positive lens group, which has a positive refractive power, and a negative lens group, which is disposed to be close to the image side thereof and has a negative refractive power, with an air gap, which is widest in the third lens group, interposed therebetween, and wherein the following Conditional Expression (1) is satisfied $$-0.45 < fGF/fGR < -0.10, \quad (1)$$

where
fGF is a focal length of the positive lens group, and
fGR is a focal length of the negative lens group.

(2) The zoom lens according to (1), wherein the following Conditional Expression (2) is further satisfied $$0.1 < L3/ft < 0.2, \quad (2)$$

where
L3 is a length of the third lens group on an optical axis, and
ft is a focal length of the whole system at the telephoto end of the zoom lens.

(3) The zoom lens according to (1) or (2), wherein the negative lens group constituting the third lens group includes a cemented lens which is disposed to be closest to the object side, has a negative refractive power, and is formed of a positive lens convex toward the object side and a negative lens concave toward the image side, and wherein the following conditional expressions (3) and (4) are satisfied $$0.2 < (RLR1 - RLR2)/(RLR1 + RLR2) < 0.8, \quad (3)$$

$$ndLR2 > 1.72, \quad (4)$$

where
RLR1 is a radius of curvature of a surface of the cemented lens closest to the object side,
RLR2 is a radius of curvature of a surface of the cemented lens closest to the image side, and
ndLR2 is a refractive index of the negative lens at the d-line.

(4) The zoom lens according to any one of (1) to (3), wherein the following Conditional Expression (5) is further satisfied $$vdp/vdn > 1.18, \quad (5)$$

where
vdp is an Abbe number of the positive lens constituting the cemented lens at the d-line, and
vdn is an Abbe number of the negative lens constituting the cemented lens at the d-line.

(5) The zoom lens according to any one of (1) to (4), wherein the negative lens group constituting the third lens group includes, in order from the object side, a cemented lens which has a negative refractive power and is formed of a positive lens convex toward the object side and a negative lens concave toward the image side, and a second positive lens.

(6) The zoom lens according to any one of (1) to (5), further including a lens that has no power in practice.

(7) An imaging apparatus including:
a zoom lens that includes, in order from the object side, a first lens group which has a positive refractive power, a second lens group which has a negative refractive power, and a third lens group which has a positive refractive power,
an imaging device that converts an optical image, which is formed by the zoom lens, into an electrical signal,
wherein the zoom lens performs zooming by changing spaces between the first to third lens groups during zooming from a wide-angle end to a telephoto end,
wherein the third lens group includes, in order from the object side, a positive lens group, which has a positive refractive power, and a negative lens group, which is disposed to be close to the image side thereof and has a negative refractive power, with an air gap, which is widest in the third lens group, interposed therebetween, and wherein the following Conditional Expression (1) is satisfied.

$$-0.45 < fGF/fGR < -0.10, \quad (1)$$

where
fGF is a focal length of the positive lens group, and
fGR is a focal length of the negative lens group.

(8) The imaging apparatus according to (7), wherein the zoom lens further includes a lens that has no power in practice.

The present disclosure contains subject matter related to that disclosed in Japanese Priority Patent Application JP 2011-142615 filed in the Japan Patent Office on Jun. 28, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from the object side:
a first lens group that has a positive refractive power;
a second lens group that has a negative refractive power; and
a third lens group that has a positive refractive power,
wherein zooming is performed by changing spaces between the first to third lens groups during zooming from a wide-angle end to a telephoto end,
wherein the third lens group includes, in order from the object side, a positive lens group, which has a positive refractive power, and a negative lens group, which is disposed to be close to the image side thereof and has a negative refractive power, with an air gap, which is widest in the third lens group, interposed therebetween,
wherein the negative lens group includes a cemented lens which has a negative refractive power and which is formed of, in order from the object side, a positive lens and a negative lens, and a second positive lens, and
wherein the following Conditional Expression (1) is satisfied $$-0.45 < fGF/fGR < -0.10, \quad (1)$$

where
fGF is a focal length of the positive lens group, and
fGR is a focal length of the negative lens group.

2. The zoom lens according to claim 1, wherein the following Conditional Expression (2) is further satisfied $$0.1 < L3/ft < 0.2, \quad (2)$$

where
L3 is a length of the third lens group on an optical axis, and
ft is a focal length of the whole system at the telephoto end of the zoom lens.

3. The zoom lens according to claim 2,
wherein the negative lens group includes the cemented lens which is disposed to be closest to the object side, and is formed of the positive lens which is convex toward the object side and the negative lens which is concave toward the image side, and
wherein the following conditional expressions (3) and (4) are satisfied $$0.2 < (RLR1-RLR2)/(RLR1+RLR2) < 0.8, \quad (3)$$

and $$ndLR2 > 1.72, \quad (4)$$

where
RLR1 is a radius of curvature of a surface of the cemented lens closest to the object side,
RLR2 is a radius of curvature of a surface of the cemented lens closest to the image side, and
ndLR2 is a refractive index of the negative lens at the d-line.

4. The zoom lens according to claim 3, wherein the following Conditional Expression (5) is further satisfied $$vdp/vdn > 1.18, \quad (5)$$

where
vdp is an Abbe number of the positive lens constituting the cemented lens at the d-line, and
vdn is an Abbe number of the negative lens constituting the cemented lens at the d-line.

5. The zoom lens according to claim 2, wherein the negative lens group includes, in order from the object side, the cemented lens which has a negative refractive power and is formed of the positive lens which is convex toward the object side and the negative lens which is concave toward the image side, and a second positive lens.

6. The zoom lens according to claim 1, wherein the positive lens group comprises a plurality of lenses.

7. The zoom lens according to claim 1, wherein an aperture stop is located within the positive lens group.

8. The zoom lens according to claim 1, wherein the following Conditional Expression (1') is satisfied $$-0.35 < fGF/fGR < -0.20. \quad (1')$$

9. The zoom lens according to claim 1, wherein at least a part of one lens group among the first, second, and third lens groups is configured to be shifted in a direction which is substantially perpendicular to an optical axis.

10. An imaging apparatus comprising:
a zoom lens that includes, in order from the object side, a first lens group which has a positive refractive power, a second lens group which has a negative refractive power, and a third lens group which has a positive refractive power; and
an imaging device that converts an optical image, which is formed by the zoom lens, into an electrical signal,
wherein the zoom lens performs zooming by changing spaces between the first to third lens groups during zooming from a wide-angle end to a telephoto end,
wherein the third lens group includes, in order from the object side, a positive lens group, which has a positive refractive power, and a negative lens group, which is disposed to be close to the image side thereof and has a negative refractive power, with an air gap, which is widest in the third lens group, interposed therebetween,
wherein the negative lens group includes a cemented lens which has a negative refractive power and which is formed of, in order from the object side, a positive lens and a negative lens, and a second positive lens, and
wherein the following Conditional Expression (1) is satisfied $$-0.45 < fGF/fGR < -0.10, \quad (1)$$

where
fGF is a focal length of the positive lens group, and
fGR is a focal length of the negative lens group.

11. The imaging apparatus according to claim 10, wherein the following Conditional Expression (2) is further satisfied $$0.1 < L3/ft < 0.2, \quad (2)$$

where
L3 is a length of the third lens group on an optical axis, and
ft is a focal length of the whole system at the telephoto end of the zoom lens.

12. The imaging apparatus according to claim 11,
wherein the negative lens group includes the cemented lens which is disposed to be closest to the object side, and is formed of the positive lens which is convex toward the object side and the negative lens which is concave toward the image side, and
wherein the following conditional expressions (3) and (4) are satisfied $$0.2 < (RLR1-RLR2)/(RLR1+RLR2) < 0.8, \quad (3)$$

and $$ndLR2 > 1.72, \quad (4)$$

where
- RLR1 is a radius of curvature of a surface of the cemented lens closest to the object side,
- RLR2 is a radius of curvature of a surface of the cemented lens closest to the image side, and
- ndLR2 is a refractive index of the negative lens at the d-line.

13. The imaging apparatus according to claim 12, wherein the following Conditional Expression (5) is further satisfied $$\nu dp/\nu dn > 1.18, \tag{5}$$

where
- νdp is an Abbe number of the positive lens constituting the cemented lens at the d-line, and
- νdn is an Abbe number of the negative lens constituting the cemented lens at the d-line.

14. The imaging apparatus according to claim 11, wherein the negative lens group includes, in order from the object side, the cemented lens which has a negative refractive power and is formed of the positive lens which is convex toward the object side and the negative lens which is concave toward the image side, and a second positive lens.

15. The imaging apparatus according to claim 10, wherein the positive lens group comprises a plurality of lenses.

16. The imaging apparatus according to claim 10, wherein an aperture stop is located within the positive lens group.

17. The imaging apparatus according to claim 10, wherein the following Conditional Expression (1') is satisfied $$-0.35 < fGF/fGR < -0.20. \tag{1'}$$

18. The imaging apparatus according to claim 10, at least a part of one lens group among the first, second, and third lens groups is configured to be shifted in a direction which is substantially perpendicular to an optical axis.

19. The imaging apparatus according to claim 10, wherein the imaging device includes a photoelectric conversion device.

20. The imaging apparatus according to claim 19, wherein the photoelectric conversion device is selected from the group including a CCD and a CMOS.

* * * * *